(12) United States Patent
Kondo

(10) Patent No.: US 6,418,959 B2
(45) Date of Patent: Jul. 16, 2002

(54) RUBBER COMPONENT FOR FUEL SEAL

(75) Inventor: Yoshihiro Kondo, Sashima-gun (JP)

(73) Assignee: Kyosan Denki Co., Ltd., Sashima-gun (JP)

( * ) Notice: Subject to any disclaimer, the term of this patent is extended or adjusted under 35 U.S.C. 154(b) by 0 days.

(21) Appl. No.: 09/734,712

(22) Filed: Dec. 13, 2000

(30) Foreign Application Priority Data

Dec. 24, 1999 (JP) ............................................. 11-368521

(51) Int. Cl.[7] ................................................ F16K 24/04
(52) U.S. Cl. ...................................... 137/202; 277/944
(58) Field of Search .......................... 137/202; 277/652, 277/944, 945, 946

(56) References Cited

U.S. PATENT DOCUMENTS

| | | | | |
|---|---|---|---|---|
| 2,597,976 A | * | 5/1952 | Cousins | 277/944 X |
| 2,868,575 A | * | 1/1959 | Hawxhurst | 277/944 X |
| 5,313,977 A | * | 5/1994 | Bergsma et al. | 137/202 X |
| 5,605,175 A | * | 2/1997 | Bergsma et al. | 137/202 |
| 5,782,262 A | * | 7/1998 | Kim | 137/202 |

FOREIGN PATENT DOCUMENTS

| | | |
|---|---|---|
| JP | B2-SHO 63-11149 | 3/1984 |
| JP | B2-HEI-4-27939 | 7/1984 |

* cited by examiner

Primary Examiner—Gerald A. Michalsky
(74) Attorney, Agent, or Firm—Oliff & Berridge PLC

(57) ABSTRACT

A rubber component that provides a fuel seal is provided which includes a base formed principally of fluorosilicon rubber or hydrin rubber, and a coating layer applied by coating to the base and formed principally of nylon or fluorine-contained resin.

2 Claims, 4 Drawing Sheets

RUBBER COMPONENT FOR FUEL SEAL

INCORPORATION BY REFERENCE

The disclosure of Japanese Patent Application No. 11-368521 filed on Dec. 24, 2000 including the specification, drawings and abstract is incorporated herein by reference in its entirety.

BACKGROUND OF THE INVENTION

1. Field of the Invention

The invention relates to a rubber component that provides a fuel seal, which is used as a sealing member, such as an O-ring, a packing or a gasket, for preventing leakage of fuel or fuel vapors in a fuel tank or a fuel supply system for vehicles, or used as a diaphragm or the like that operates in fuel or fuel vapors.

2. Discussion of Related Art

Fuel vapors leaking out into the atmosphere from a vehicular fuel system may cause air pollution, and therefore restrictions are imposed on the emission of such fuel vapors. For example, fuel vapors emitted from a fuel tank are adsorbed by an adsorbent contained in a canister, and sucked under vacuum into an intake pipe during operation of the engine, together with the outside air admitted through an air inlet of the canister. The fuel vapors and the air thus introduced into the intake pipe are then supplied to and burned in a combustion chamber of the engine. The canister is held in communication with the outside air, or the ambient atmosphere, and a control valve for adjusting the pressure in the fuel tank is provided between the tank and the canister.

In the above-described evaporative emission control system for preventing fuel vapors from being discharged into the atmosphere, a breather line communicating with the canister and an internal pressure control line for regulating the pressure in the fuel tank are provided with various control components. In this system, a reliable seal needs to be proviced at mounting portions of these components so that fuel vapors are prevented from leaking into the atmosphere through the mounting portions.

Fuel vapors may also leak from mounting portions of various components provided in any type of fuel system as well as the above evaporative emission control system, and therefore a secure seal needs to be provided at the mounting portions. The leakage of fuel vapors is prevented not only with sealing members, such as an O-ring, a packing and a gasket, provided at mounting portions of these components, but also with diaphragms used in various types of control valves that are opened and closed with various kinds of pressures applied thereto in response to an external control signal. In such a control valve, the diaphragm is used to support the valve for smooth operation thereof, such that the diaphragm prevents fuel vapors present inside of the diaphragm from leaking out into the atmosphere outside of the diaphragm.

As described above, the sealing members, such as an O-ring, packing and a gasket, or diaphragms operating in fuel and fuel vapors are used in stationary or fixed portions, or internal operating portions, of various types of components used in the fuel system of the vehicle. Both the sealing members and the diaphragms are required to provide a reliable or secure seal so as to prevent fuel and fuel vapors inside the fuel system from leaking out of the system. Depending upon the usage and environments of use, the sealing members and the diaphragms are required to exhibit various characteristics, such as heat resistance, oil resistance, elasticity or flexibility, and gas impermeability, and to reliably maintain its sealing function for a long period of time.

To this end, rubber, such as epichlorohydrin rubber or fluorosilicon rubber, has been often used as a material for those components. However, the use of only these types of rubber does not give the resulting components with sufficient characteristics, such as gas impermeability. Especially when sour gasoline containing peroxides is used as fuel, carbon-to-carbon connections of hydrocarbon in the rubber material are broken, and the sealing members or diaphragms become soft and adhesive, and thus cannot provide sufficient sealing capabilities.

In view of the above problem, Japanese Patent No. HEI 4-27939, for example, discloses a technology of forming a diaphragm, using rubber whose main component is acrylonitrile-butadiene copolymer rubber (hereinafter referred to as "NBR"). With this technology, the diaphragm is formed by subjecting the surface of the rubber material to chromic acid etching for increased adhesiveness, to thus form a processed layer on which a coating layer made of nylon resin is formed.

Although the NBR used as a rubber material in the above technology is relatively inexpensive, it is difficult to coat its surface with various types of layers. For example, there is a need to perform a process for increasing adhesiveness, such as etching with chromic acid as described above, that is suitable for a material coating the rubber. The reason why the chromic acid etching provides increased adhesiveness of nylon is not apparent from the above-identified patent publication. In fact, various processes were actually carried out, and the chromic acid etching was found to be effective to increase the adhesiveness, for the reason that was only presumed afterwards.

Thus, there has been a demand for such rubbers that exhibit the above-mentioned characteristics, and also can be easily coated at their surfaces with nylon for increasing adhesiveness.

In the meantime, fluoro rubber is known as a rubber material that allows permeation of only a small amount of gasoline vapors. However, fluoro rubber has disadvantages such as insufficient low-temperature characteristics and expensiveness.

SUMMARY OF THE INVENTION

It is therefore an object of the invention to provide a rubber component used as a fuel seal, which is excellent in the heat resistance, oil resistance, elasticity or flexibility and gas impermeability, which can reliably maintain its sealing function for a long period of time, and which can be easily manufactured at a reduced cost.

To accomplish the above object, a rubber component used as a fuel seal is provided according to the first aspect of the invention, which includes a base formed principally of fluorosilicon rubber, and a coating layer formed principally of nylon, the base being coated with the coating layer.

According to the second aspect of the invention, there is provided a rubber component that provides a fuel seal, which includes a base formed principally of fluorosilicon rubber, and a coating layer formed principally of a fluorine-contained resin, the base being coated with the coating layer.

According to the third aspect of the invention, there is provided a rubber component that provides a fuel seal, which includes a base formed principally of hydrin rubber, and a coating layer formed principally of nylon, the base being coated with the coating layer.

According to the fourth aspect of the invention, there is provided a rubber component that provides a fuel seal, which includes a base formed principally of hydrin rubber, and a coating layer formed principally of a fluorine-contained resin, the base being coated with the coating layer.

DETAILED DESCRIPTION OF PREFERRED EMBODIMENTS

Figure 2:
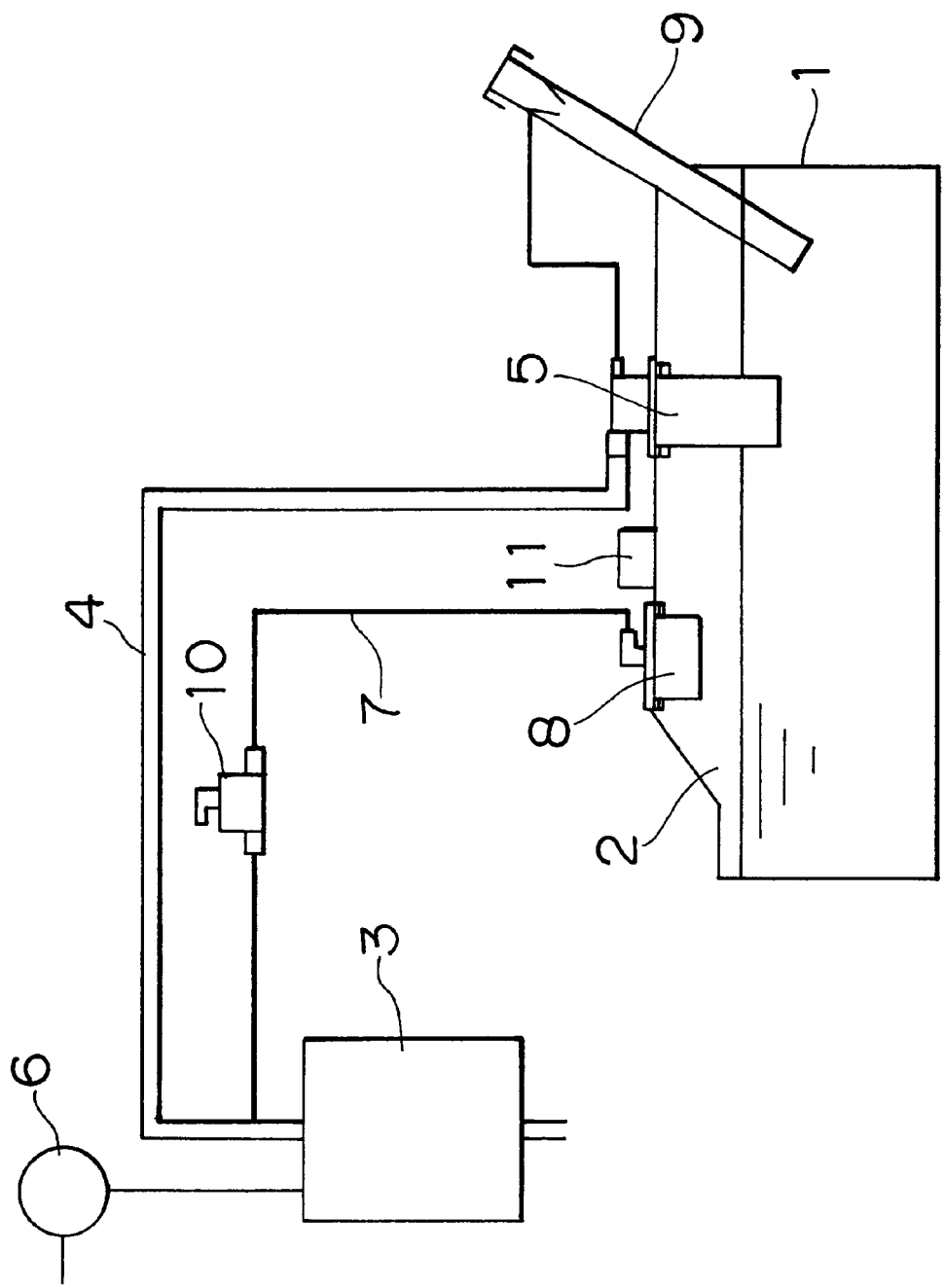
FIG. 2 is a schematic view showing the construction of an evaporative emission control system including various devices in which rubber members for fuel seals according to the invention are employed.

FIG. 2 shows an evaporative emission control system as an example in which a rubber component or components for use as fuel gas seal is/are employed. In this evaporative emission control system adapted to prevent air pollution due to fuel vapors emitted from a fuel tank 1, an interior 2 of the fuel tank 1 is connected to a canister 3 by a breather pipe 4, and an ORVR valve 5 is mounted in an opening in the upper wall portion of the tank through which the breather pipe 4 communicates with the interior 2 of the tank. The ORVR valve 5 also communicates with an upper portion of a fuel fill pipe 9 protruding from the fuel tank 1, so as to regulate the pressure in that portion. The canister 3 is equipped with a purge valve 6.

The interior of the fuel tank 1 communicates with a portion of the breather pipe 4 that is close to the canister 3, through a pressure regulating conduit 7. A cut-off valve 8 is disposed at one end of the pressure regulating conduit 7 on the side of the fuel tank. An internal pressure control valve 10 is disposed in the middle of the pressure regulating conduit 7. The opening and closing of the internal pressure control valve 10 is controlled by an external control device that receives a pressure signal from a pressure sensor 11 provided in the fuel tank 1 and outputs a control signal.

Figure 3:
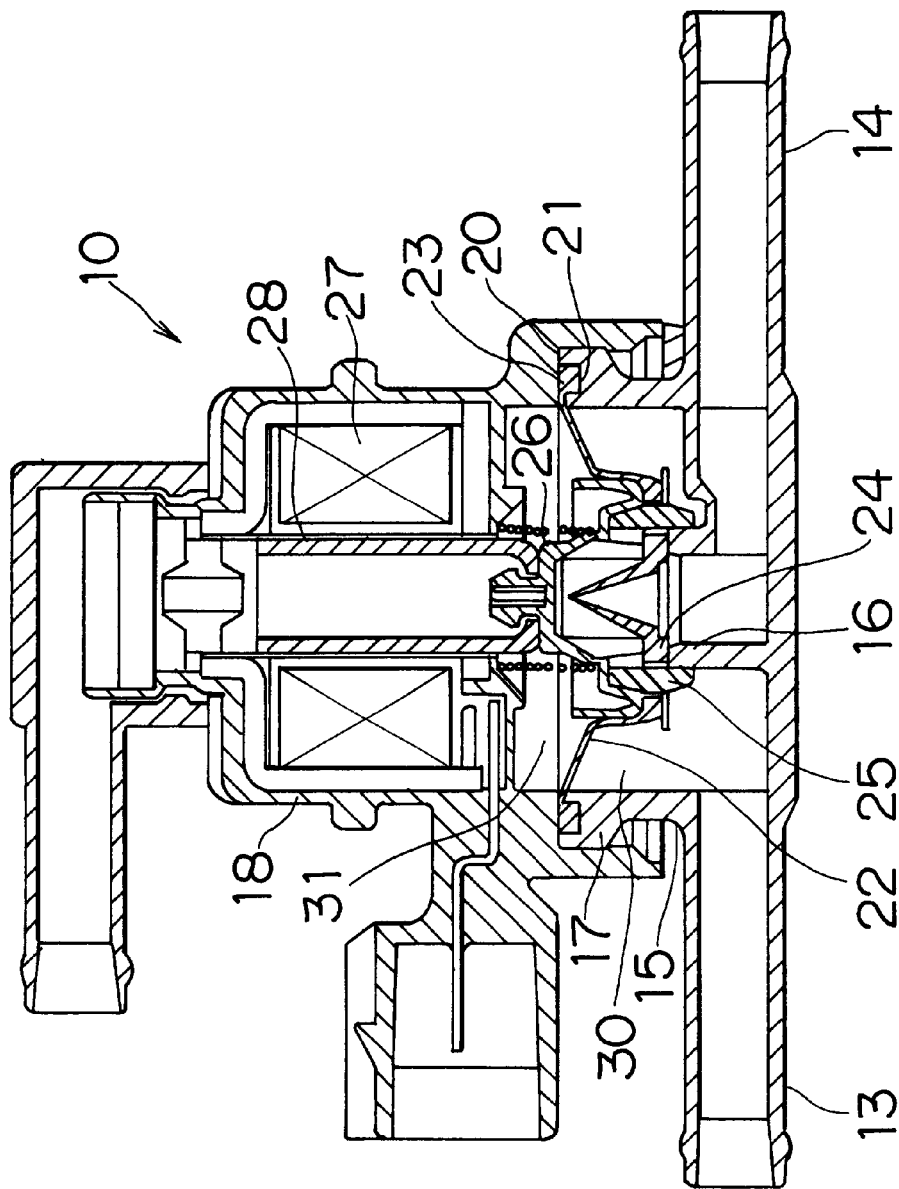
FIG. 3 is a cross-sectional view of an internal pressure control valve used in the evaporative emission control system of FIG. 2.

One example of the internal pressure control valve 10 is illustrated in FIG. 3.

The internal pressure control valve 10 has a main body 15 including a first connecting portion 13 and a second connecting portion 14 which are connected with the pressure regulating conduit 7 shown in FIG. 2, and a valve seat portion 16 located at the middle part of the main body 15 and protruding upwards as viewed in FIG. 3. An upper portion of an outer peripheral wall 17 of the main body 15 is covered with a valve casing 18 that houses a valve driving portion, such as a coil. An annular groove 21 is formed in an upper face 20 of the outer peripheral wall 17. The groove 21 receives a protrusion 23 formed on the outer periphery of a diaphragm 22. With the protrusion 23 of the diaphragm 22 received in the groove 21 in this manner, the valve casing 18 is placed on the outer peripheral wall 17 of the main body 15 so that the outer periphery of the diaphragm 22 is firmly fixed in position while providing a seal at the joint between the valve casing 18 and the main body 15.

A valve body 24 is provided at the center of the diaphragm 22. As shown in FIG. 3, when the lower face of the valve body 24 abuts on the valve seat portion 16, the first connecting portion 13 and the second connecting portion 14 of the main body 15 are disconnected from each other. If the valve body 24 moves away from the valve seat portion 16, the first connecting portion 13 and the second connecting portion 14 are brought into communication with each other.

The diaphragm 22 and the valve body 24 located at the center of the diaphragm 22 are connected to a valve-body actuating member 26 via a fixed member 25. When a coil 27 disposed inside the valve casing 18 is energized, a magnetic member 28 is lifted upwards in FIG. 3, and an engaging portion at the lower end of the magnetic member 28 engages with an engaging portion of the valve actuating member 26 thereby to elevate the valve actuating member 26. As a result, the valve body 24 and the central portion of the diaphragm 22 are lifted or elevated by the actuating member 26 via the fixed member 25.

The diaphragm 22 used in the internal pressure control valve 10 is necessary for preventing fuel vapors in the lower chamber 30 defined by the diaphragm 22 from leaking out when the valve body 24 moves vertically between the open position and the closed position. In FIG. 3, the diaphgram 22 needs to surely seal the lower chamber 30 through which fuel vapors flow, from an upper chamber 31 defined by the diaphragm 22 and communicating with the atmosphere.

Figure 4:
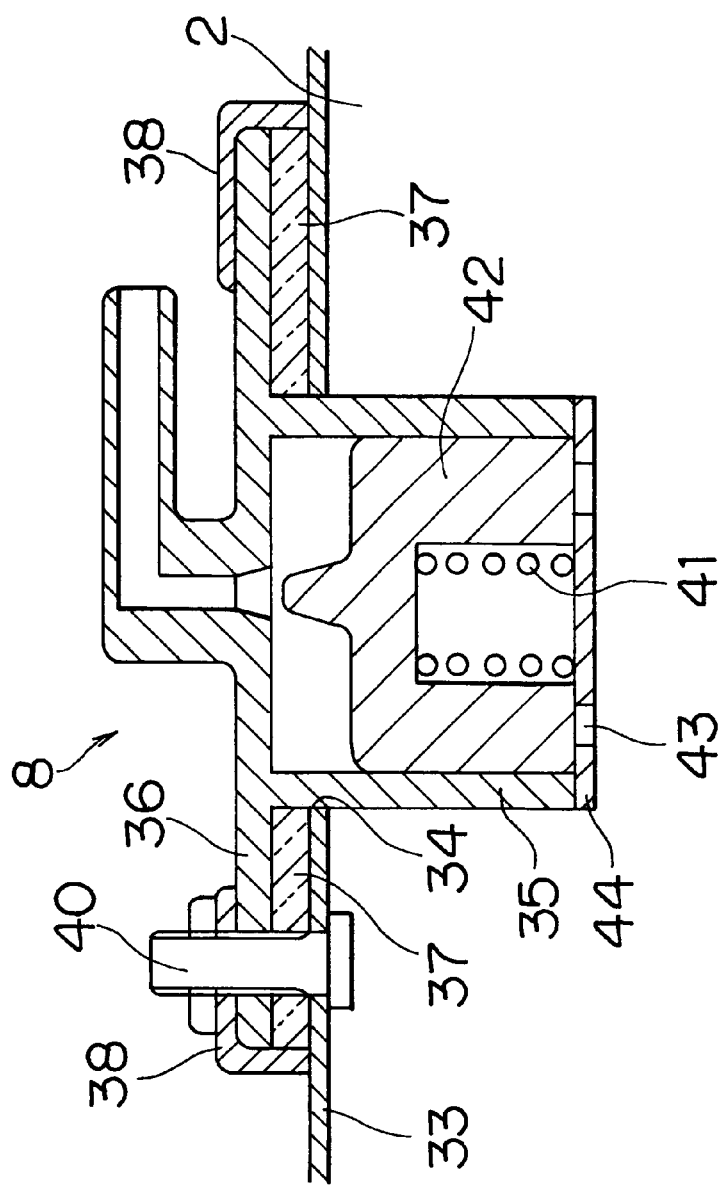
FIG. 4 is a cross-sectional view of a cut-off valve used in the evaporative emission control system shown in FIG. 2.

In the meantime, a valve schematically shown in FIG. 4, for example, may be used as the cut-off valve 8 in the evaporative emission control system shown in FIG. 2. More specifically, a casing 35 is fitted into an opening 34 formed in an upper wall 33 of the fuel tank 1. A packing 37 is interposed between a flange portion 36 of the casing 35 and the upper wall 33 of the fuel tank 1 such that the outer peripheries of the flange portion 36 and the packing 37 are surrounded by a plate 38. The upper wall 33, packing 37, flange portion 36 and the plate 38 are securely clamped together by a bolt 40. A valve body 42, which is normally urged upwards by a spring 41, is vertically movably provided inside the casing 35. The lower end of the valve body 42 is covered with and fixed to a lid body 44 having communication holes 43.

In the cut-off valve 8 as described above, a seal is provided by fastening the packing 37 and adjacent members together by means of the bolt 40, so as to prevent fuel vapors in the interior 2 of the fuel tank from leaking to the outside through the opening 34 for mounting the cut-off valve 8. It is thus important to secure a seal at the mounting portion of the cut-off valve 8.

In the evaporative emission control system, the ORVR valve 5 is additionally fixed to the fuel tank 1. The ORVR valve 5 is mounted in the same manner as the cut-off valve 8. That is, a seal is provided in the ORVR valve 5 by fastening or clamping a packing with a bolt.

In addition to the packings and diaphragm used in the evaporative emission control system as described above, various components using packings and diaphragms need to be used in a fuel system of the vehicle so as to surely prevent leakage of fuel vapors through these components. In addition, since fuel vapors may leak to the outside of the fuel system through materials of the packings and diaphragms, it is also necessary to use materials capable of preventing such leakage.

Since the above-mentioned components used in the fuel system are subject to extraordinary environments during use, these components are required to demonstrate various characteristics, such as heat resistance, oil resistance, flexibility and gas impermeability, while assuring sealing effects for a long period of time.

As a result of various experiments conducted in view of the above situations, it was found that if the surface of a packing or a diaphragm made of fluorosilicon rubber or hydrin rubber is coated with nylon or fluororesin, the amount of permeation of fuel vapors can be reduced without damaging the properties specific to the rubber material. Furthermore, the aforementioned desired characteristics can be satisfied, and the coating can be easily accomplished without requiring any special treatment for increasing the adhesiveness. The invention was developed based on this finding.

Figure 1A:
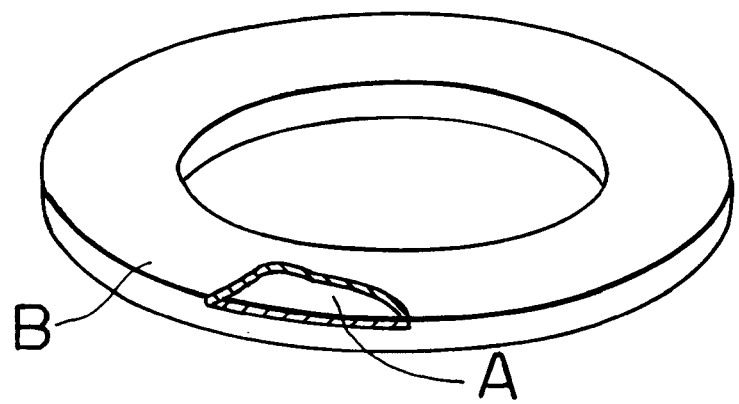
FIG. 1A is a perspective view of a packing according to an embodiment of the invention, in which a part of a coating material is removed.
Figure 1B:
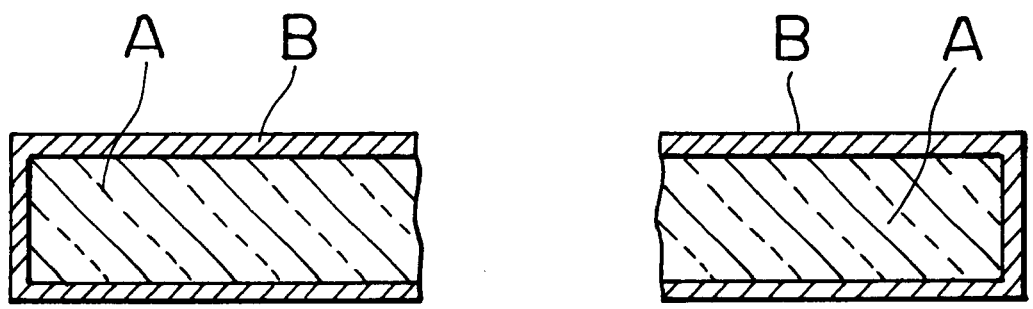
FIG. 1B is a cross-sectional view showing a part of the packing.

FIG. 1A is a perspective view of the packing 37 as a first embodiment of the invention when it is applied to the packing 37 as shown in FIG. 4. FIG. 1B is a partially enlarged cross-sectional view of the first embodiment. In the first embodiment, fluorosilicon rubber is used as a base A, and its entire outer surface is coated with nylon as a coating layer B. In FIG. 1A, a part of the coating layer B is removed from the packing 37.

In a second embodiment of the invention, fluorosilicon rubber is used as a base A, and the fluorosilicon rubber is coated, for example, with fluorine-contained resin or fluororesin, such as polytetrafluorethylene (PTFE), as a coating layer B.

Furthermore, in a third embodiment of the invention, hydrin rubber is used as a base A, and the hydrin rubber is coated with nylon as a coating layer B. In a fourth embodiment of the invention, hydrin rubber is used as a base A, and the hydrin rubber is coated with a fluororesin as mentioned above.

As a result of experiments, it was confirmed that all of the above embodiments are excellent in terms of various characteristics, such as heat resistance, oil resistance, flexibility and gas impermeability. Also, the coating can easily be carried out by a known method, for example, by dissolving nylon or fluororesin as a coating material in a solvent and applying the coating material to the base.

The rubber component used as a fuel seal constructed according to the invention provides excellent properties or characteristics, such as high degrees of heat resistance, oil resistance, flexibility and gas impermeability. Also, the rubber material of the base can be easily coated with nylon or fluororesin as a coating layer, to thus provide an inexpensive rubber component for a fuel seal.

What is claims is:

1. An assembly including a valve system and a fuel tank, comprising:

a valve body;

a valve casing that receives the valve body; and a sealing member that is interposed between the valve casing and a wall of the fuel tank;

wherein said sealing member comprises a base comprising a selected one of fluorosilicon rubber and hydrin rubber, and a coating layer comprising a selected one of nylon and fluorine-contained resin, said base being coated with the coating layer.

2. An assembly according to claim 1, wherein said sealing member comprises a packing, and said valve casing includes a flange portion, said assembly further comprising a fastener that fastens the packing between the flange portion and the wall of the fuel tank.

* * * * *